(12) United States Patent
Heinrich

(10) Patent No.: US 11,467,068 B2
(45) Date of Patent: Oct. 11, 2022

(54) MICROTOME AND METHOD FOR POSITIONING A MICROTOME SPECIMEN HEAD

(71) Applicant: Leica Biosystems Nussloch GmbH, Nussloch (DE)

(72) Inventor: Mark-Oliver Heinrich, Darmstadt (DE)

(73) Assignee: LEICA BIOSYSTEMS NUSSLOCH GMBH, Nussloch (DE)

( * ) Notice: Subject to any disclaimer, the term of this patent is extended or adjusted under 35 U.S.C. 154(b) by 163 days.

(21) Appl. No.: 16/623,796

(22) PCT Filed: Nov. 26, 2018

(86) PCT No.: PCT/EP2018/082578
§ 371 (c)(1),
(2) Date: Dec. 18, 2019

(87) PCT Pub. No.: WO2019/105894
PCT Pub. Date: Jun. 6, 2019

(65) Prior Publication Data
US 2021/0140854 A1    May 13, 2021

(30) Foreign Application Priority Data
Nov. 30, 2017    (DE) ...................... 10 2017 128 491.5

(51) Int. Cl.
*G01N 1/06*    (2006.01)
(52) U.S. Cl.
CPC ......... *G01N 1/06* (2013.01); *G01N 2001/066* (2013.01)

(58) Field of Classification Search
CPC ........................... G01N 1/06; G01N 2001/066
USPC ....................................... 83/72, 76, 370, 367
See application file for complete search history.

(56) References Cited

U.S. PATENT DOCUMENTS

| | | | |
|---|---|---|---|
| 3,884,563 A | 5/1975 | Evans et al. | |
| 5,065,657 A | 11/1991 | Pfeifer | |
| 5,226,335 A | 7/1993 | Sitte et al. | |
| 5,535,654 A * | 7/1996 | Niesporek ................ | G01N 1/06 83/915.5 |
| 5,761,977 A | 7/1998 | Jakobi et al. | |
| 6,253,653 B1 | 7/2001 | Walter et al. | |
| 6,598,507 B1 | 7/2003 | Günther et al. | |
| 6,634,268 B1 | 10/2003 | Guenther et al. | |
| 8,640,585 B2 | 2/2014 | Züst et al. | |
| 9,606,026 B2 * | 3/2017 | Heid ........................ | G01N 1/06 |
| 2004/0026630 A1 | 2/2004 | Mohun et al. | |
| 2005/0036667 A1 | 2/2005 | So et al. | |
| 2009/0241751 A1 | 10/2009 | Walter | |
| 2012/0240737 A1 | 9/2012 | Yang et al. | |

(Continued)

*Primary Examiner* — Nhat Chieu Q Do
(74) *Attorney, Agent, or Firm* — Hodgson Russ LLP

(57) ABSTRACT

A microtome, having a sectioning knife and having a specimen head (5) movable relative to the sectioning knife; having an electric drive system (16) for motorized movement of the specimen head (5); having a sensor (21) for detecting the presence of the specimen head (5) at a reference position (z1); and having a control device (18) for controlling the electric drive system (16) and for processing signals of the sensor (21), the control device (18) being configured to control the electric drive system (16) to move the specimen head (5) and to halt the specimen head (5) in reaction to detection of the presence of the specimen head (5) at the reference position (z1).

7 Claims, 3 Drawing Sheets

(56) References Cited

U.S. PATENT DOCUMENTS

| | | | |
|---|---|---|---|
| 2013/0166072 A1* | 6/2013 | Yang | G01N 1/06 700/275 |
| 2014/0026728 A1 | 1/2014 | Walter | |
| 2016/0245728 A1* | 8/2016 | Walter | G01N 1/06 |
| 2017/0067800 A1 | 3/2017 | Briggman | |

* cited by examiner

MICROTOME AND METHOD FOR POSITIONING A MICROTOME SPECIMEN HEAD

CROSS-REFERENCE TO RELATED APPLICATIONS

The present application is the U.S. national phase of International Application No. PCT/EP2018/082578 filed Nov. 26, 2018, which claims priority of German Application No. 10 2017 128 491.5 filed Nov. 30, 2017, the entire disclosure of which is incorporated herein by reference.

FIELD

The present invention relates to a microtome having a sectioning knife and having a specimen head movable relative to the sectioning knife, and to a method for positioning a specimen head of a microtome at a reference position.

BACKGROUND OF THE INVENTION

Microtomes are increasingly being automated in order to reduce the workload on the operator and ensure easy handling. A correspondingly automated microtome furthermore allows throughput to be increased. For automation of microtomes, they are equipped not only with motorized feed mechanisms for bringing the sample against the sectioning knife, but also with motorized drive systems that bring about a sectioning motion between the sample and the sectioning knife.

One such microtome, embodied as a rotating disc microtome, is described, for example, in WO 98/04898 A1.

Another type is known as a "rotary" microtome and is described, for example, in U.S. Pat. No. 5,065,657. A rotary microtome generally comprises a specimen head on which the sample that is to be sectioned is held. In a rotary microtome, the specimen head is usually moved vertically up and down. During this vertical motion, the sample that is to be sectioned is guided past the sectioning knife that is arranged fixedly in the rotary microtome. The vertical motion can be brought about by means of a crank mechanism that is driven by a handwheel. The crank mechanism converts the rotary motion of the handwheel into a vertical motion of the specimen head.

U.S. Pat. No. 6,598,507 B1 describes a motorized rotary microtome of this kind for producing thin samples, the cut being produced by means of a relative motion between the sample and the sectioning knife. A drive system, having a motor, a control unit, and a handwheel, is provided in order to generate the sectioning motion. The handwheel is equipped with an incremental transducer that outputs corresponding rotation signals of the handwheel to the control unit. The motor is then correspondingly controlled by the control unit, producing the sectioning motion.

U.S. Pat. No. 8,640,585 B2 discloses an apparatus for producing serial images of a sample using a sliding microtome. The sample is arranged in a sample holder, and a knife is moved above the sample in a sectioning direction. Arranged above the knife is a microscope having a camera for acquiring corresponding images of the sectioned surface of the sample which has just been generated.

U.S. Pat. No. 3,884,563 A describes a microtome with which thin serial sections of organic material can be sectioned from a dried and frozen sample by means of a rotating knife, in order to make possible acquisition of serial images.

It is desirable for the specimen head in a rotary microtome to be capable of being positioned as accurately as possible, for example so that serial images of this kind can be acquired.

SUMMARY OF THE INVENTION

The present invention proposes a microtome having a sectioning knife and a specimen head movable relative to the sectioning knife, and a method for positioning a specimen head of a microtome at a reference position, having the features of the independent claims. Advantageous embodiments are the subject matter of the dependent claims and of the description that follows.

The microtome comprises an electric drive system for motorized movement of the specimen head, as well as a sensor for detecting the presence of the specimen head at a reference position and a control device for controlling the electric drive system and for processing signals of the sensor. The control device is configured to control the electric drive system to move the specimen head and to halt the specimen head in reaction to detection of the presence of the specimen head at the reference position.

In the context of the method according to the present invention, the specimen head is correspondingly moved by means of the electric drive system relative to the sectioning knife. The specimen head is halted when the sensor detects the fact that the specimen head is at the reference position. Advantages and preferred embodiments of the microtome according to the present invention and of the method according to the present invention are correspondingly evident from the description that follows.

The invention furnishes a capability allowing a desired position to be reliably arrived at by the specimen head, and furthermore a capability for high reproducibility in terms of bringing the specimen head to that position and halting it there. Usefully, the control unit stops the electric drive system, and thus the motion of the specimen head, as soon as the sensor recognizes the presence of the specimen head in the desired reference position, so that the specimen head can be moved into that position very precisely and highly reproducibly.

Advantageously, a specimen or sample can be arranged on the specimen head. The electric drive system can be embodied, for example, as an electric motor, in particular as a stepping motor. By moving the specimen head by means of the electrical drive system it is possible to guide the specimen over the edge of the knife, and sections of the sample can be generated.

For example, the specimen head and thus the sample can be moved precisely and highly reproducibly into the reference position after each cut that is performed. This reference position can be, in particular, a position at which the specimen head and the sample arranged thereon are optimally accessible. When this reference position is reliably and highly accurately arrived at, it becomes possible in particular to create serial images of sections always at the same reference position. It is thus possible, for example, to acquire a photographic image of the sample at the reference position, for example after each cut, with high reproducibility; and, for example, several images can be superimposed to yield a three-dimensional image or can be played back as a film so as thereby to obtain a three-dimensional impression of the sample.

Advantageously, the microtome comprises a handwheel for manually moving the specimen head, said handwheel being coupled to the specimen head via a mechanical drivetrain, in particular a crank mechanism. The handwheel can usefully be mounted rotatably and can comprise a handle. Manual rotation of the handwheel causes the specimen head to be moved, and thus causes the specimen to be guided over the edge of the knife. A rotary motion of the handwheel is converted by the mechanical drivetrain in particular into a vertical up-and-down motion of the specimen head.

The sensor is advantageously configured to detect a position of the handwheel. The position of the handwheel, which is coupled via the mechanical drivetrain to the specimen head, is thus preferably detected by means of the sensor. This results, in particular, in especially high accuracy in terms of detecting the specimen head position, since a sinusoidal relationship exists, in particular, between the rotary motion of the handwheel and the vertical motion of the specimen head. The current position of the specimen head can be precisely determined, and the presence of the specimen head at the reference position can be reliably recognized, from the current position of the handwheel or the current angular position of the rotary motion of the handwheel.

The sensor is preferably a rotation-angle sensor. The current position or angular position of the rotary motion of the handwheel can be precisely detected by means of such a rotation-angle sensor. Because the rotary motion of the handwheel correlates directly with the motion of the specimen head, the current position of the specimen head can thus be precisely determined.

The mechanical drivetrain preferably comprises a crank mechanism. The handwheel is usefully connected nonrotatably to a crankshaft of that crank mechanism, so that a rotation of the handwheel also causes the crankshaft to rotate. A corresponding rotary motion of the crankshaft is in turn converted, for example via a connecting rod, into the vertical motion of the specimen head.

According to a preferred embodiment of the invention, the sensor is configured to detect a dead center position of the crank mechanism. A dead center position of the mechanical drivetrain, embodied as a crank mechanism, is thus preferably detected. This results in particularly highly accurate detection, since there exists between the rotary motion of the crank mechanism, or of the crankshaft of the crank mechanism, and the motion of the specimen head, in particular, a sinusoidal relationship that is particularly flat in the region of the dead center point, in particular the top dead center point.

Advantageously, the microtome comprises a further sensor for detecting the presence of the specimen head in a position before the reference position. This sensor can be embodied, for example, as a photoelectric barrier or a magnetic switch, and the specimen head can be equipped, for example, with a corresponding triggering tab or a corresponding triggering magnet. By means of this further sensor it is thus possible to recognize when the specimen head is approaching the reference position and will soon reach it. The microtome can thus be prepared in timely fashion to stop the motion of the specimen head in the near future.

According to a preferred embodiment, the control device is configured to control the electric drive system to move the specimen head initially at a first speed and, in reaction to detection of the presence of the specimen head at the position before the reference position, to move the specimen head at a second speed that is slower than the first speed. The specimen head is thus advantageously moved by means of the electric drive system, relative to the sectioning knife of the microtome, initially at a first speed and then, as the reference position is approached, at a slower second speed. The specimen head is thus initially moved quickly at the higher first speed until it is recognized that the specimen head is in the position before the reference position and is thus approaching the reference position. The speed of the specimen head is thereupon reduced, and the specimen head is moved at the slower second speed in order to enable precise stoppage of the specimen head at the reference position.

The control device is preferably configured to carry out one or several functions after the specimen head is halted. One or several functions, in particular imaging of a specimen present on the specimen head, are therefore preferably triggered after the specimen head is halted. It is thus possible, for example, to automatically create serial images of sections of the sample, always at the same reference position. As a further such function, for example, an automatic replacement of the knife and/or of a sample holder can also take place in order to deliver a new sample for processing.

Further advantages and embodiments of the invention are evident from the description and the appended drawings.

It is understood that the features recited above and those yet to be explained below are usable not only in the respective combination indicated, but also in other combinations or in isolation, without departing from the scope of the present invention.

The invention is schematically depicted in the drawings on the basis of an exemplifying embodiment, and will be described in detail below with reference to the drawings.

DETAILED DESCRIPTION OF THE DRAWINGS

Figure 1:
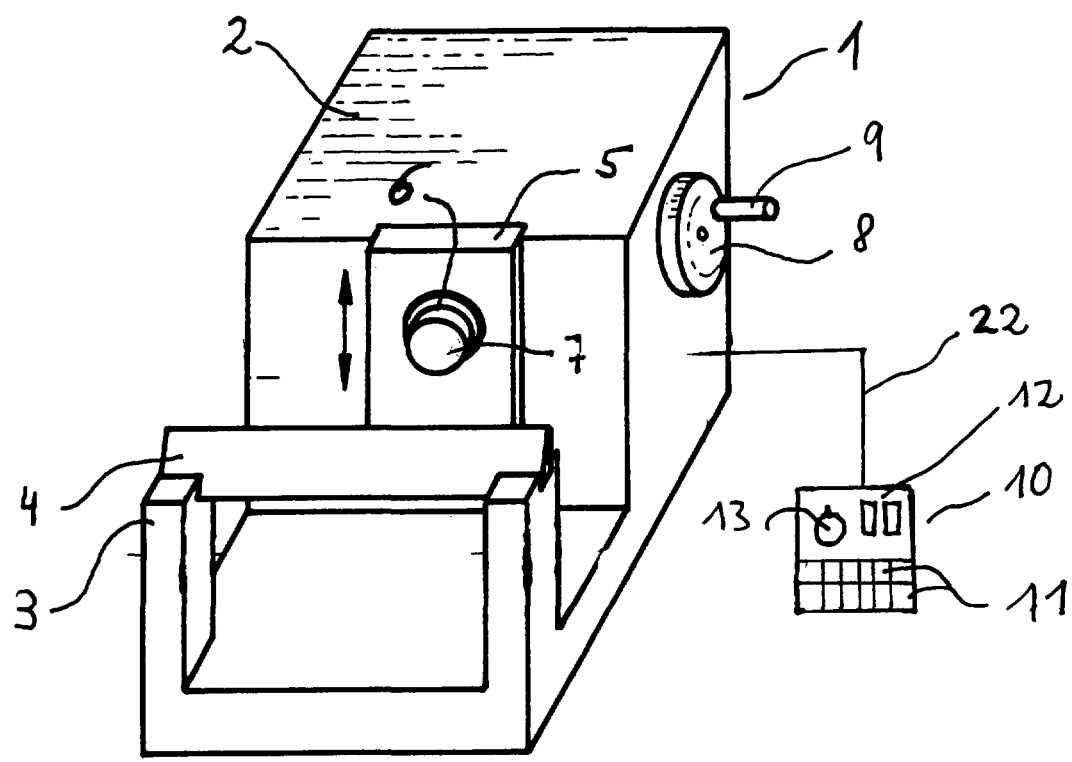
FIG. 1 is a perspective depiction of a rotary microtome.

FIG. 1 shows a microtome 1 having a microtome housing 2 and a knife holder 3 for receiving a sectioning knife 4. A specimen (sample) 7 is arranged, with its specimen holder 6, on a specimen head 5 in the form of a slide which is movable in a double-arrow direction. A rotatably mounted handwheel 8 having a handle 9 is arranged on microtome 1. Rotating handwheel 8 causes specimen head 5 to be moved, and causes specimen 7 to be guided over the edge of knife 4.

Figure 2:
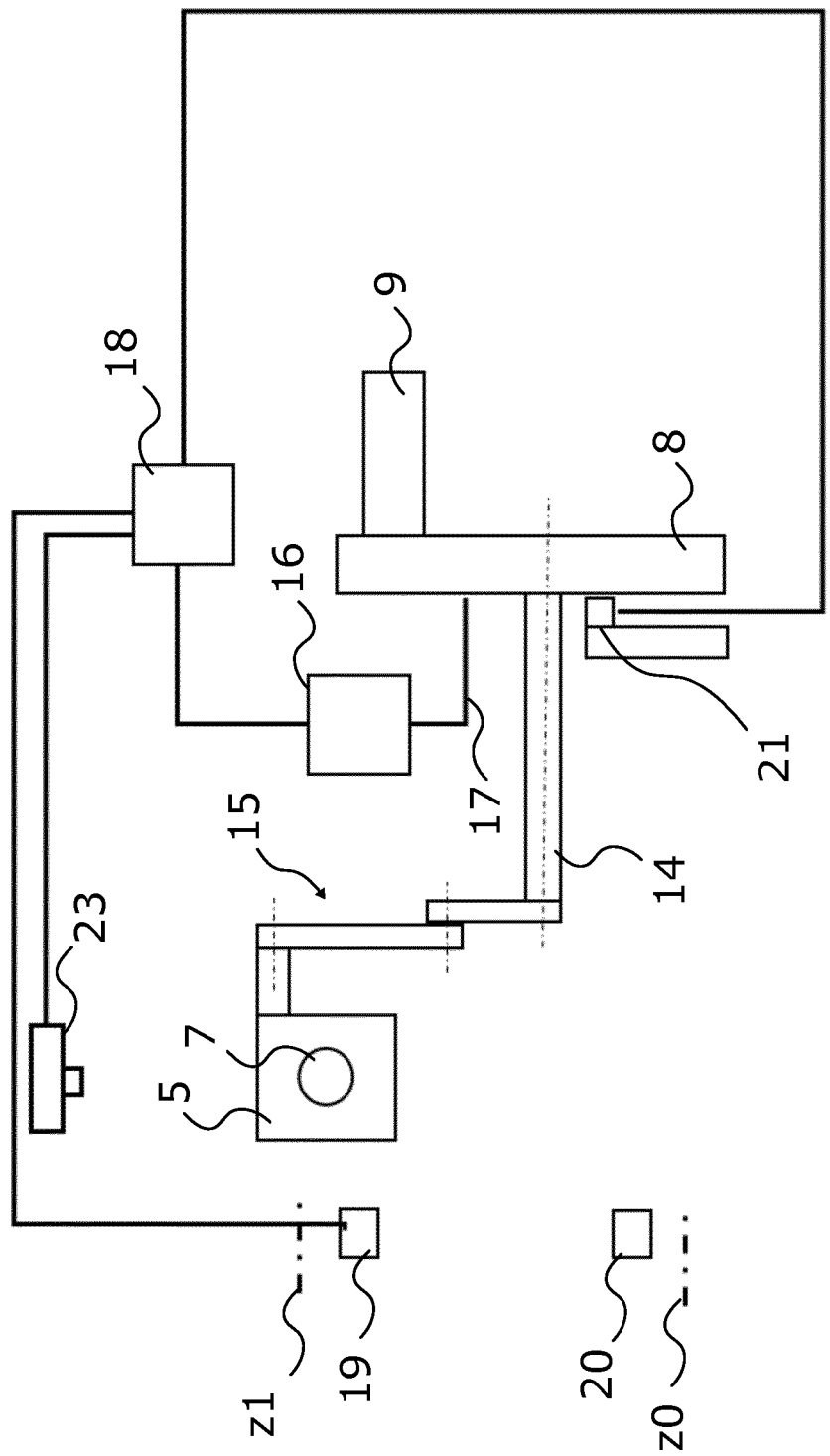
FIG. 2 schematically shows a drivetrain of a rotary microtome in accordance with a preferred embodiment of the invention.

As also shown in FIG. 2, handwheel 8 can be connected to specimen head 5 via a mechanical drivetrain such as a crank mechanism 15 (cf. U.S. Pat. No. 5,065,657). The handwheel is connected nonrotatably to a crankshaft 14 of crank mechanism 15, so that a rotation of handwheel 8 also causes crankshaft 14 to be rotated.

Also provided for motorized upward and downward motion of specimen head 5 (i.e. the sectioning motion) is an electric motor 16, embodied e.g. as a stepping motor, which is connected to handwheel 8 or to crankshaft 14 via a mechanical drivetrain 17 embodied, for example, as a belt drive. A clutch can be provided for decoupling motor 16 from handwheel 8 or from crankshaft 14. The clutch is, in particular, opened for manual sectioning, so that the handwheel does not then need to be rotated manually against the resistance of the electric motor. Motor 16 is controlled by a control unit 18 (inside housing 2) which is configured to control the microtome components.

An external control console 10 is connected to control unit 18 via a control lead 22. Control console 10 comprises a keypad 11 for numerical inputs, a rotary controller 13 for continuously modifiable inputs, and switches 12 for inputting specific switch positions and operating states.

Specimen head 5 is additionally movable linearly forward and backward (in the direction of the sectioning knife), for which a handwheel (not shown) having a mechanical or electrical drivetrain and an electric motor can likewise be provided. The section thickness and the "specimen pullback" (before moving out of the lower position, the specimen head is first moved back into the upper position so that it is moved with a clearance past the knife edge) are implemented by way of this drivetrain. The specimen head is additionally mounted in linearly movable fashion for that purpose, for instance in a slide. An electrical drivetrain can be implemented, for example, by the fact that the handwheel has associated with it an incremental transducer for detecting the rotary motion, the signals of which transducer are delivered to the control unit which then in turn controls the electric motor as a function of those signals.

The drivetrain for upward and downward motion will now be explained in more detail with reference to FIG. 2. By means of crank mechanism 15, specimen head 5 is displaceable between a lower position z0 and an upper position z1. Connected to control unit 18 are an upper sensor 19 and a lower sensor 20 that detect the presence of specimen head 5. Sensors 19, 20 can be embodied, for example, as photoelectric barriers or as magnetic switches. Specimen head 5 can correspondingly be equipped, for example, with a triggering tab or a triggering magnet.

The distance between upper sensor 19 and lower sensor 20 defines a so-called "sectioning window" in which sample 7 is guided past sectioning knife 4. Within the sectioning window, the speed of specimen head 5 relative to sectioning knife 4 is intended in particular to be slow in order to ensure clean sectioning. Outside the sectioning window, on the other hand, i.e. in particular upon the return travel of specimen head 5 upward, travel can occur more quickly.

In addition, the invention now furnishes a solution for allowing specimen head 5 to arrive reliably at a desired position. That position is, in particular, upper position z1 at which specimen head 5, and sample 7 arranged thereon, are optimally accessible. Arriving at that position with high accuracy is desirable in particular so as to make possible serial imaging of sections always at the same position.

In accordance with the preferred embodiment of the invention presented here, microtome 1, in particular the mechanical drivetrain, is thus equipped with a further sensor 21 that recognizes the presence of specimen head 5 in the desired position. Sensor 21 is connected to control unit 18, which stops motor 16 as soon as sensor 21 detects specimen head 5.

In accordance with the preferred embodiment of the invention presented here, sensor 21 is associated with handwheel 8 in order to detect the position of handwheel 8 and thus of crankshaft 14 and therefore of specimen head 5. This results in particularly accurate detection, since there exists between the rotary motion of handwheel 8 and the vertical motion of specimen head 5 a sinusoidal relationship that is particularly flat in the region of the top dead center point that is relevant here. A reproducibility of 1 to 2 µm for the specimen head position can be achieved with these features. Sensor 21 can be embodied in particular as a rotation angle sensor.

When specimen head 5 is in this position, that fact is detected by means of sensor 21 and reported to control unit 18. Control unit 18 can trigger further functions in addition to halting motor 16, for example imaging the surface of the sample. A triggering lead or release lead of a camera 23 can also be connected to control unit 18 for that purpose.

Alternatively or additionally, an automatic changeover of sample holder 6 can take place in order to deliver a new sample 7 for processing, or that position is traveled to for a knife replacement in order to create the longest possible distance between the movable specimen head 5 and knife 4.

As a result of the good reproducibility, a photographic image can be acquired after each section. Several images can be superimposed to yield a three-dimensional image, or can be played back as a film in order thereby to obtain a three-dimensional impression of the sample.

The invention can also be used in a slide microtome. These two types of microtome can also each be incorporated into a cryostat. The photographic device can be arranged in encapsulated fashion in the cryostat chamber, or can be implemented via a mirror device outside the cryostat chamber.

Figure 3:
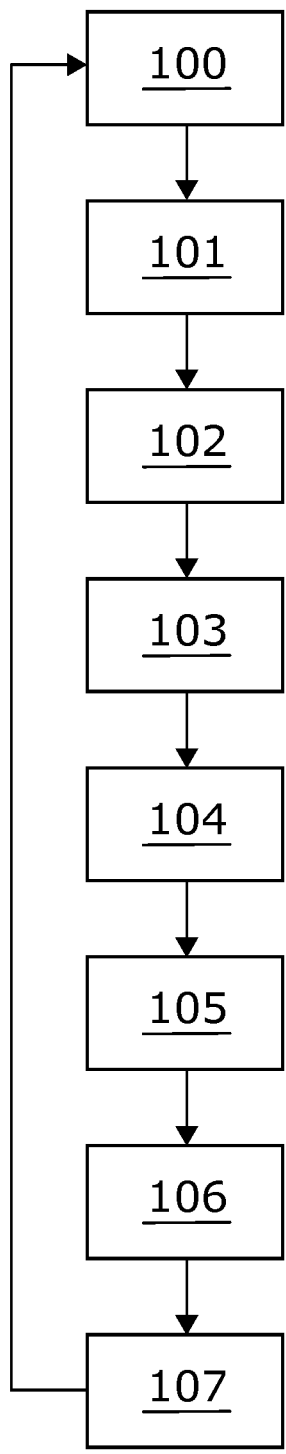
FIG. 3 is a flow chart showing a preferred embodiment of the invention.

A preferred embodiment of a method according to the present invention, with which particularly high accuracy is achievable, will now be explained with reference to FIG. 3.

In a step 100, specimen head 5 is in position z1.

In a step 101, specimen head 5 is moved downward at a first speed (feed speed) until it is detected by sensor 19 and thus enters the sectioning window.

In a step 102, the speed is reduced to a second speed (sectioning speed), and specimen head 5 is now moved downward more slowly until it is detected by sensor 20 and thus leaves the sectioning window. In the meantime, sectioning takes place.

In a step 103, the speed is increased again to the first speed, and specimen head 5 is moved farther downward until it reaches bottom dead center point z0.

In a step 104, specimen head 5 is then moved linearly downward.

In a step 105, specimen head 5 is then moved upward, behind and past the knife, at the first speed until it is again detected by sensor 19.

In a step 106, according to the preferred embodiment of the invention the speed is again reduced, preferably to the second speed, and specimen head 5 is moved farther upward until it reaches top dead center point z1 and sensor 21 simultaneously responds.

In a step 107, electric motor 16 is then stopped and one or more desired functions, in particular for generating serial images, are triggered.

Once the functions are completed, the sequence preferably begins again so that overall, in particular, serial images of the sample surface can be acquired.

What is claimed is:

1. A microtome (1), having a sectioning knife (4) and having a specimen head (5) movable relative to the sectioning knife (4) between a reference position (z1) and a lower position (z0); the microtome (1) comprising:
   an electric drive system (16) for motorized movement of the specimen head (5);
   a handwheel (8) coupled to the specimen head (5) via a mechanical drivetrain (15) comprising a crank mechanism, the handwheel (8) being manually operable for moving the specimen head (5);
   a sensor (21) for detecting the presence of the specimen head (5) at the reference position (z1), wherein the sensor (21) is configured to detect a dead center position of the crank mechanism to detect the presence of the specimen head (5) at the reference position (z1);

an upper sensor (19) for detecting the presence of the specimen head (5) in an upper position below the reference position;

a lower sensor (20) for detecting the presence of the specimen head (5) in a lower position (z0); and a control device (18) for controlling the electric drive system (16) and for processing signals of the sensor (21), the upper sensor (19), and the lower sensor (20), the control device (18) being configured to control the electric drive system (16) to:

move the specimen head (5) downward initially at a first speed in reaction to detection of the presence of the specimen head (5) at the upper position by the upper sensor, move the specimen head (5) downward at a second speed that is slower than the first speed until detection of the presence of the specimen head at the lower position by the lower sensor, move the specimen head (5) at the first speed in reaction to detection of the presence of the specimen head (5) when the specimen head leaves the lower position (z0) by the lower sensor (20), and halt the specimen head (5) in reaction to detection of the presence of the specimen head (5) at the reference position (z1).

2. The microtome (1) according to claim 1, the sensor (21) being configured to detect a position of the handwheel (8).

3. The microtome (1) according to claim 2, the sensor (21) being a rotation-angle sensor.

4. The microtome (1) according to claim 1, the control device (18) being configured to carry out one or several functions after the specimen head (5) is halted.

5. A method for sectioning a sample mounted on a specimen head (5) of a microtome (1), the method comprising:

providing the sample on the specimen head, detecting the specimen head (5) at the reference position (z1) by means of a sensor (21), wherein the sensor (21) detects a position of a handwheel (8) coupled via a mechanical drivetrain (15) to the specimen head (5), wherein the mechanical drivetrain (15) is embodied as a crank mechanism, and wherein the sensor (21) detects a dead center point of the mechanical drivetrain (15) to detect that the specimen head (5) is at the reference position (z1); and moving downward the specimen head (5) by means of an electric drive system (16) relative to a sectioning knife (4) of the microtome (1) initially at a first speed until detection of the presence of the specimen head (5) at an upper position by means of an upper sensor (19);

moving downward the specimen head (5) at a second speed that is slower than the first speed until detection of the presence of the specimen head at the lower position by means of the lower sensor, moving the specimen head (5) at the first speed in reaction to detection of the presence of the specimen head (5) when the specimen head leaves the lower position by means of the lower sensor (20); and halting the specimen head (5) when the sensor (21) detects that the specimen head (5) is at the reference position (z1).

6. The method according to claim 5, further comprising triggering one or several functions after the specimen head (5) is halted.

7. The method according to claim 6, wherein imaging of a specimen (7) present on the specimen head (5) is triggered after the specimen head (5) is halted.

* * * * *